Patented May 27, 1952

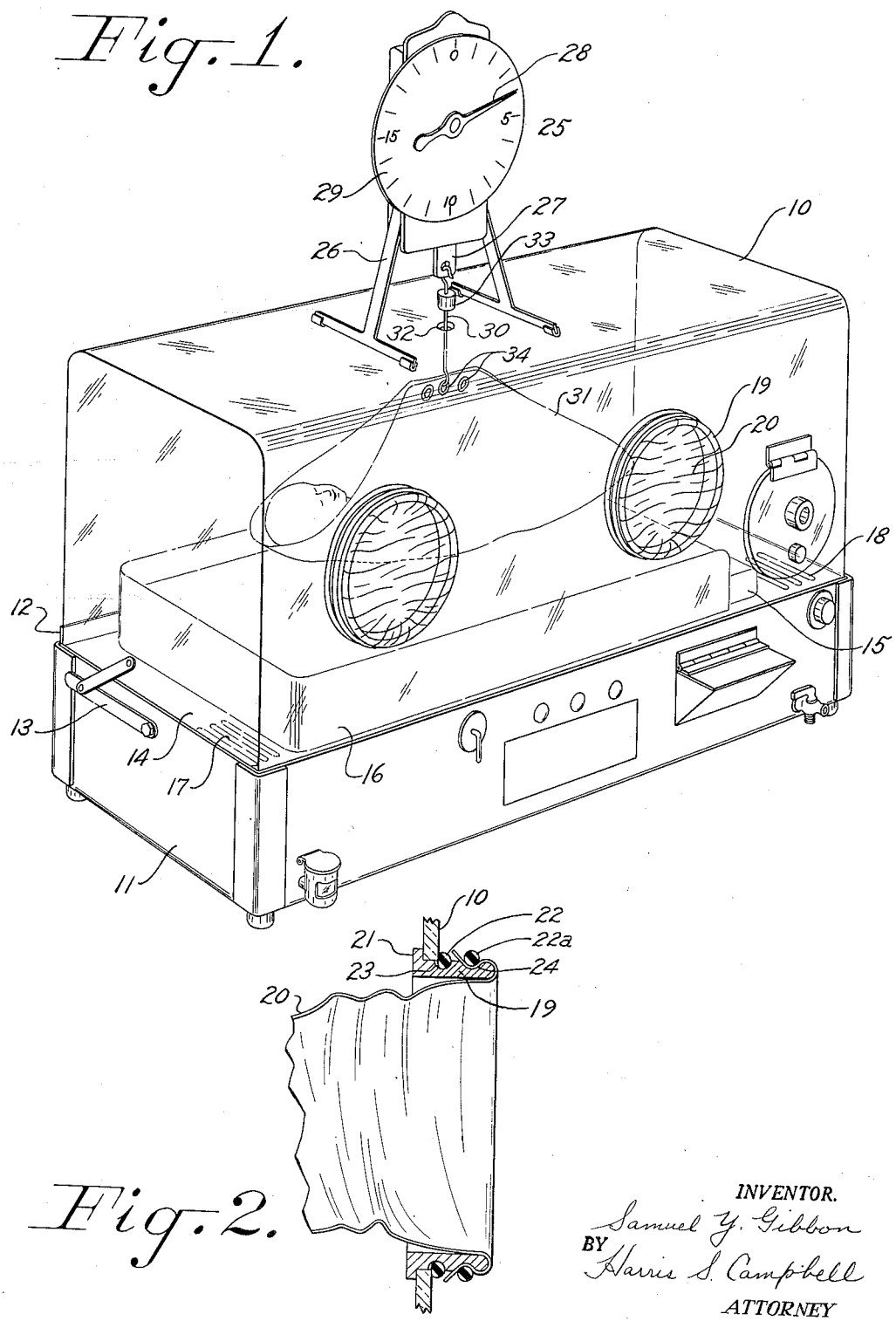

2,598,532

UNITED STATES PATENT OFFICE 2,598,532

INFANT INCUBATOR EQUIPMENT

Samuel Y. Gibbon, Jenkintown, Pa., assignor, by mesne assignments, to Children's Hospital of Philadelphia, Philadelphia, Pa., a corporation of Pennsylvania Application August 23, 1948, Serial No. 45,670

6 Claims. (Cl. 128—1)

This invention relates to incubator apparatus suitable for use for infants such as those which are prematurely born or those requiring special care and isolation. The invention is particularly concerned with improvements in the construction of the enclosure unit and accessories for use therewith.

In apparatus of this nature it is desirable that complete isolation of the occupant be maintained. In order to prevent contamination of the air supply in the occupant's space, it is preferred that fresh air from an outside source be introduced into the circulating system and air from the room in which the incubator is located be prevented from gaining access to the occupant's compartment. This may be accomplished by providing a positive pressure within the occupant's space so that any leakage which may occur will be from the enclosed space to the room rather than vice versa. This positive pressure also facilitates providing service for the occupant so that when the access door is opened airflow is from the inside to the outside. Thus, sterilized equipment needed for the care of the occupant such as feeding bottles, diapers, and the like, may be passed through the access door. Likewise, the sterilized hands of the attendant may be passed into the occupant's space through suitable openings equipped with closure sleeves so that the occupant may be given proper attention without exposure.

One of the problems in maintaining proper isolation is the need for keeping a record of the occupant's weight. Removal of the occupant for this purpose is not recommended. It has previously been proposed that weighing apparatus be kept permanently in the occupant's space so that at any time the patient may be placed upon the scale to obtain the weight. This arrangement, however, involves making a much larger enclosure than would ordinarily be required, in order to accommodate the bulky weighing equipment. Furthermore, such an arrangement increases the cost of manufacture of the incubator unit itself and involves in addition the supplying of an expensive set of scales for every unit. This means a considerable increase in capital outlay when a large number of incubator units are to be used in a hospital nusery. The increased space required for the larger units is also a factor to be considered.

With the construction of the present invention the weighing apparatus or scale may be stored and used outside the occupant's compartment. The only piece of equipment required inside the enclosure is a fabric sling which is used to support the infant during the weighing operation. At other times this sling may be kept folded without occupying appreciable space. The scale is arranged to be supported on the upper surface of the enclosure with a tension member which passes through an opening to hold the sling with its occupant during weighing. This arrangement requires only one set of scales to take care of any number of incubator units. The scales may be stored in an out-of-the-way position when not in use. At the same time each occupant has an individual sling which is used for the sole purpose of securing its weight record.

The present invention further contemplates the use of an improved construction for attaching the closure sleeves to provide for a simple and positive ring attachment without the need for a complicated assembly operation such as cementing.

Other objects and advantages of the invention will be evident from the description of the drawing in which—

Figure 1 is a perspective view of incubator apparatus illustrating the use of weighing equipment according to the present invention.

Figure 2 is a sectional view to an enlarged scale through one of the arm openings illustrating the manner of construction and assembly of the sleeve retaining ring.

From Figure 1, it will be seen that the incubator unit consists primarily of the transparent box or dome 10 and the lower base unit 11. The enclosure dome 10 is hinged along one lower edge by a hinge 12 to permit access to the interior by raising the whole dome. In this manner easy access is obtained at the level of the mattress, thereby simplifying the operation of placing an infant in or removing it from the incubator. Links 13 are pivotally connected to the dome 10 and the base 11 to provide for supporting the cover unit in the open position.

The circulation and conditioning apparatus is completely housed in the lower unit 11. This contains the circulating blower, the humidifying apparatus and the heating and cooling equipment for maintaining a controlled temperature of the air passing through the occupant's space. The base chamber is separated from the occupant's space by a lid plate 14 which forms the floor of the occupant's space. A mattress 15 is provided for the occupant and this is positioned by a retaining wall 16 fastened to the floor plate 14. The conditioned air is passed through the occupant's space using entry slots 17 at one end of the chamber and exit slots 18 at the other end. Various controls and openings to the lower unit 11 are illustrated. These, however, are not directly concerned with the present invention but are described more fully in the co-pending application of B. Curtis Grieb 28,603, filed May 22, 1948.

In order to provide access to the enclosure by an attendant and permit handling the occupant without opening the enclosure, arm holes 19 are provided in the front of the enclosure unit 10. These arm holes support closure sleeves which permit entry of the attendant's hands while preventing ingress of air to the chamber. The closure sleeves 20 are normally rolled or folded when not in use to effectively close the arm holes as indicated generally in Figure 1. The construction of arm holes 19 and the retention of the closure sleeves 20 is clearly disclosed in Fig. 2. Here it will be seen that the sleeve supporting ring 19 is made from a cylindrical member having a flange 21 adapted to engage the inside surface of the closure wall 10 while the cylindrical portion of the ring member passes through a circular hole in the wall to the outside. The ring 19 is retained in position by a flexible band 22 having a generally circular cross-sectional shape. This band or ring 22 may be of natural or artificial rubber and is adapted to be stretched into position to fit in the groove 23. Groove 23 is located in the ring 19 in a position such that one edge is just slightly inside the surface of the enclosure 10 and is proportioned to cause a certain amount of deformation in the ring 22 when it is stretched into place, thus providing for retention of the ring 19 in the enclosure 10 and causing sealing action between these parts.

The cylindrical end of the flexible sleeve 20 is retained in position on the ring 19 by means of a second resilient ring 22a which holds the end of the sleeve in the groove 24. This manner of assembly permits the sleeves 20 to be easily removed for purposes of sterilization or replacement. Sleeves 20 are preferably made of low-cost, light-weight plastic material or impregnated fabric and thus may be replaced without undue expense whenever the incubator receives a new occupant. Replacement at this time is desirable from a sanitary viewpoint, particularly to prevent the possibility of transfer if disease germs or the like from one occupant to the next. Sleeves may also require replacement from time to time because of wear or damage.

Weighing apparatus for use with the incubator is clearly illustrated in Figure 1. Here the scale 25 is illustrated having legs 26 adapted to support the scale on the top of the enclosure 10. Member 27 at the lower side of the scale is mechanically connected to the mechanism in a fashion to cause the pointer 28 to register the weight on the dial 29. In order to support the occupant in a fashion suitable for transferring the weight reaction to the scale member 27, a tension rod 30 is provided having a suitable hook at the upper end to support the rod 30 from the scale member 27. A hole 32 is located in the proper position in the upper surface of the enclosure 10 to allow the tension member 30 to pass through freely during the weighing operation. A stopper 33 is constructed to permit the rod member 30 to pass through it, the stopper 33 being of proper size to fit the hole 32 and thus support the rod 30 in a convenient manner and at the same time close the hole 32 when the scale is not in use.

The occupant's sling 31 is preferably made from sturdy fabric and is shaped with the lower side curved sufficiently to support the occupant in a secure manner and allow the sling to hang from a single point of suspension in the fashion illustrated. As will be clear from the drawing the sling is preferably provided with several grommets or reinforcements 34 at the upper edge of each of the sides of the sling. With the occupant in position the lower hook of rod 30 is then passed through the proper pair of grommets to cause the occupant to lie in a relatively horizontal position. With the multiple grommets it is thus unnecessary to shift the occupant to obtain the exact position where the sling is supported horizontally. Since the scale is preferably adjusted to account for the tare weight the occupant's weight may be read directly. After the weight has been taken the occupant is removed from the sling which may be then folded and stored in a corner of the enclosure. After the rod 30 is removed from member 27 of the scale the stopper 33 is moved to the lower end of the rod 30 and inserted into the hole 32, thus supporting the rod in an out-of-the-way position until it is needed for the next weighing operation. The scale may be removed and stored in any convenient location.

From the foregoing description, it will be evident that I have provided improved apparatus for use with an infant's incubator. The arrangement for assembling the arm-hole sleeve ring in position in the wall of the enclosure provides a simplified assembly capable of eliminating considerable time during the manufacture of the incubator. At the same time a neat and efficient installation results which is firmly retained in position by a resilient ring which also serves to produce a reliable seal to prevent the leakage of air. The weighing apparatus is simple and effective and is particularly advantageous where a number of incubator units are used together such as in a hospital. The scale being readily portable is easily set in position when it is desired to weigh the occupant. Since each occupant is supplied with its own sling which is stored inside the enclosure, complete isolation of the occupant is maintained. No increase in size of the incubator is required to store the weighing apparatus since the folded fabric sling may be stored in any convenient corner of the enclosure.

I claim:

1. An incubator of the character described having enclosure walls of relatively thin transparent material, at least one of said walls having access openings therein, flexible sleeve closures for the openings and attachment means for said sleeves having a cylindrical member with a diameter to fit the opening and an annular flange adapted to contact the wall adjacent the opening, an annular groove in said cylindrical member, an elastic ring adapted to fit in said groove and retain said cylindrical member in assembled position and attachment means for removably fastening a sleeve to said member.

2. An incubator suitable for infants incorporating an occupant's enclosure including a wall having an access opening therein, a flanged rigid ring adapted to fit said opening, a circumferential groove in said ring, an elastic ring having a circular cross-section adapted to be stretched into position into said groove, said groove being located with respect to said flange in a position such that the flange contacts the wall on the inside of the opening and the elastic ring contacts the wall on the outside of the opening, thereby supporting said rigid ring in position, attachment means for fastening a flexible closure sleeve to said rigid ring.

3. An incubator suitable for infants incorporating an occupant's enclosure including a wall having an access opening therein, a structure associated with said opening for the attachment of a closure sleeve, said structure including a rigid ring having an annular flange and two parallel grooves, an elastic retaining ring adapted to engage one of said grooves to retain said rigid ring in position in said opening and a second elastic ring adapted to engage the other of said grooves for the purpose of holding the closure sleeve in position.

4. An incubator for infants having an enclosed occupant's chamber, the upper wall of which is flat and incorporates a small opening near the central region thereof, a sling device of readily foldable material for supporting an occupant during a weighing operation, a tension member adapted to pass through the opening in the upper surface and having terminal construction for engaging said sling device on the inside of the enclosure and for engaging a weighing device outside of said enclosure.

5. An incubator for infants having an enclosed occupant's chamber, apparatus for weighing an occupant within said chamber, including a flexible sling for supporting an occupant during the weighing operation, the upper wall of said chamber having a small opening, a tension member adapted to connect to said sling inside said chamber and project upwardly through the opening, a resilient stopper proportioned to close the opening when the sling is not in use, said stopper having an opening therethrough to accommodate said tension member.

6. An incubator suitable for infants having an enclosed occupant's chamber, said chamber being provided with apparatus suitable for weighing an occupant while suspended therein, including a sling device having a curved shape to securely hold the occupant, a tension member having a terminal suitable for engaging said sling device, said chamber having a small opening in the upper surface thereof located in a position to permit said tension member to project therethrough while supporting said sling device with an occupant in suspended position clear of all surfaces.

SAMUEL Y. GIBBON.

REFERENCES CITED

The following references are of record in the file of this patent:

UNITED STATES PATENTS

| Number | Name | Date |
| --- | --- | --- |
| 217,964 | Travers | July 29, 1879 |
| 945,530 | Hayden | Jan. 4, 1910 |
| 2,243,999 | Chapple | June 3, 1941 |